United States Patent Office 3,441,299
Patented Apr. 29, 1969

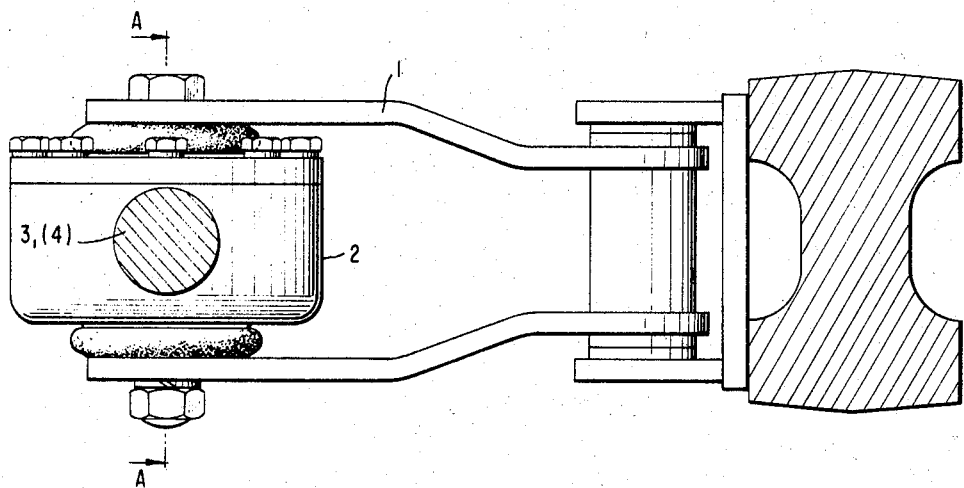
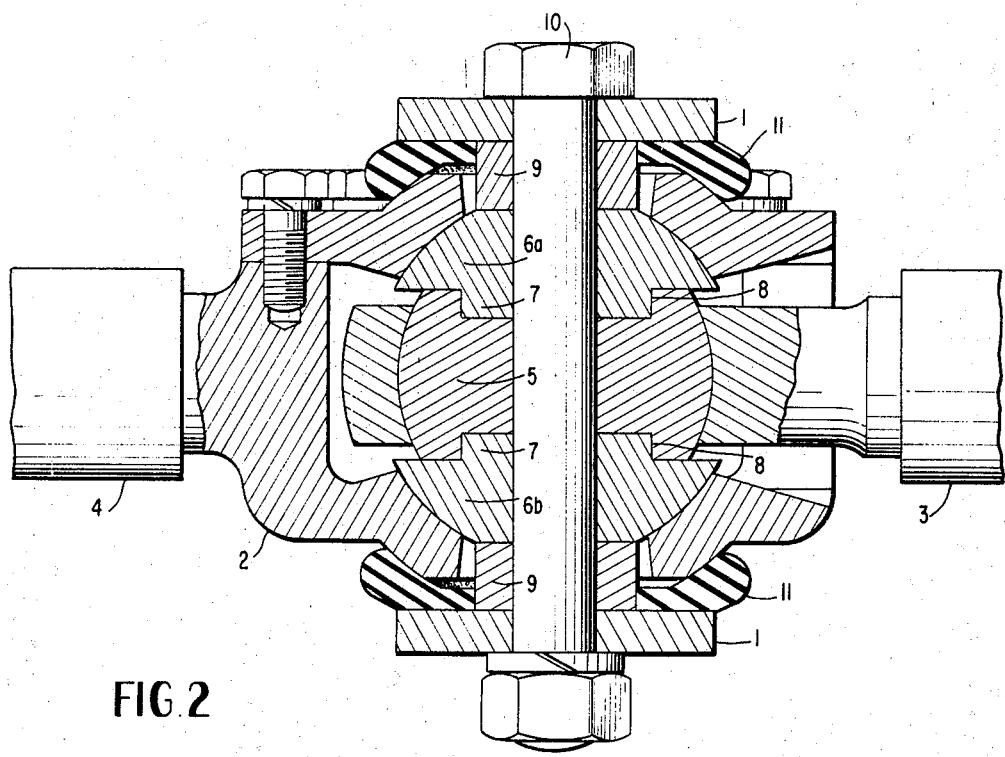

3,441,299
CONNECTING JOINT FOR A STEERING ARM AND TIE RODS
Adam Pfaar, Besse, Germany, assignor to Rheinstahl Henschel A.G., Kassel, Germany, a corporation of Germany
Filed Dec. 8, 1966, Ser. No. 600,128
Claims priority, application Germany, Dec. 28, 1965, R 42,318
Int. Cl. F16c 11/06; F16b 7/00; B25g 3/38
U.S. Cl. 287—88          6 Claims

ABSTRACT OF THE DISCLOSURE

A connecting joint for the steering arms of a vehicle includes a first steering arm having spaced ends carrying a pivot bolt therebetween, spherical means is mounted on the pivot bolt and includes a central portion of reduced diameter and two outer portions at either side thereof of greater diameter. A second one of the steering arms includes spaced ends engaging the outer portions of the spherical means and these spaced ends are positioned between the spaced ends of the first-mentioned arm. A third arm includes an end portion disposed in surrounding engaging relation to the central part of the spherical means and is positioned between the spaced ends of said second arm.

---

This invention relates to a joint for connecting a steering arm and a pair of tie rods in a vehicular steering assembly.

The volume occupied by the steering arm and tie rods in vehicles, especially military vehicles and trailers, or in special service vehicles, frequently makes it necessary to adopt a compromise between accuracy in design of lever and linkage kinematics on the one hand and the necessity of structural accommodation on the other hand, i.e., if the pivot points of the levers and linkage are positioned in a conventional manner. Heretofore, it has been necessary to mount the connecting joints individually, i.e., spatially separated from each other.

The present invention provides a construction which eliminates the aforementioned disadvantages. In the present invention, a connecting joint is provided for linkages to be used in a steering linkage, which latter may include, for example, steering arms, tie rods, steering knuckle arms, and the like. In order to simplify the description of the invention, it will be described as a joint for a plurality of steering arms, the planes of which intersect in the center of the connecting joint. One steering arm is provided with a pivot, mounted at a right angle to the axis of the steering arm, about which move the ends of the other steering arms on substantially spherically shaped members. The perpendicular pivot is mounted between the bifurcated end of one steering arm and a substantially spherical member is mounted on the pivot. A central zone or area of the substantially spherical member is enclosed within one end of one steering arm and opposed exterior portions of the substantially spherical member are enclosed within a bifurcated end of another steering arm.

The spherical member mounted on the perpendicular pivot has portions thereof of different diameters and the central portion of the spherical member preferably has a diameter smaller than the diameter of the opposed exterior portions received within one bifurcated steering arm. Also, the latter bifurcated steering arm end may be made in several parts which may be bolted together, for example.

The invention will be further illustrated by reference to the accompanying drawings in which:

FIGURE 1 is a view in elevation of the connecting joint of the present invention, and FIGURE 2 is a sectional view taken on line A—A of FIGURE 1.

Referring to the drawings, in FIGURE 1, there is shown a central steering arm 1 having a bifurcated construction. Mounted between the bifurcated ends of the steering arm 1 is the joint 2 of the present invention from which extend the two steering arms 3 and 4 from both sides of the joint, essentially at a right angle to the plane of the drawing.

Referring to FIGURE 2, it will be seen that the two steering arms 3 and 4 are mounted to execute movements in two planes, i.e., in the plane of the drawing and at right angles thereto. To effect this movement, the steering arm 3 is rotatably mounted on the central spherical zone or area 5 having a smaller diameter than the two outer substantially spherical portions 6a and 6b of larger diameter. The steering arm 4 bifurcated at the end thereof and receives, within the bifurcated end, the two outer substantially spherical parts 6a and 6b.

The outer substantially spherical parts 6a and 6b are centered in recesses 8 in the central spherical zone or area by means of the pivots 7.

By means of spacer bushings 9, and a bolt 10 which also acts as the pivot, the joint is secured together between the bifurcated ends of the steering arm 1 and sealing is effected by means of the gaskets 11.

The substantially spherical member formed of the three parts 5, 6a, and 6b has been referred to as being substantially spherical because the ends of the parts 6a and 6b, as shown in FIGURE 2, are flat so that the bushings 9 seat against the flat surfaces thereof. In other respects, the substantially spherical member is spherical and, as noted above, the portion 5 thereof is of smaller diameter than are the portions 6a and 6b.

It will be obvious to those skilled in the art that many modifications may be made within the scope of the present invention without departing from the spirit thereof, and the invention includes all such modifications.

What is claimed is:

1. A connecting joint for steering arms of a vehicle having at least three steering arms, a first one of said arms including spaced ends carrying a pivot means therebetween, substantially spherical means mounted on said pivot means, said spherical means defining a central portion and two outer portions at either side of said central portion, a second one of said arms including spaced ends engaging said outer portions of the spherical means and being positioned between the spaced ends of said first one of said arms, and a third one of said arms including an end portion disposed in surrounding engaging relation to said central portion of the spherical means and being positioned between the spaced ends of said second one of said arms, so that the axes of all three of said steering arms intersect at the center of the connecting joint and said arms are spatially movable independently of one another.

2. Apparatus as defined in claim 1 wherein the spaced ends of said second one of said arms each have a bore formed therethrough, a spacer sleeve being received within each of said bores, the spaced ends of said second one of said arms defining oppositely facing spherical sockets for engaging the outer portions of said spherical means.

3. Apparatus as defined in claim 2 wherein said bores have a substantially greater diameter than the associated spacer sleeves.

4. Apparatus as defined in claim 1 wherein the central portion of said spherical means is of less diameter than said two outer portions, said outer portions being of substantially the same diameter.

5. Apparatus as defined in claim 1 wherein each of said outer portions of the spherical means includes a pivot portion received within a recess formed in said central portion.

6. Apparatus as defined in claim 1 wherein the spaced ends of said second one of said arms are of bipartite construction.

References Cited

UNITED STATES PATENTS 2,066,695   1/1937   Peo.
2,470,205   5/1949   Alldredge.
2,551,437   5/1951   Jeffus _____ 287—88
2,841,427   7/1958   Sheppard _____ 287—87

CARL W. TOMLIN, *Primary Examiner.*

ANDREW V. KUNDRAT, *Assistant Examiner.*

U.S. Cl. X.R.

287—89; 280—95